(12) United States Patent
Han

(10) Patent No.: US 12,461,409 B2
(45) Date of Patent: Nov. 4, 2025

(54) DISPLAY DEVICE INCLUDING LIGHT BLOCKING STRUCTURE

(71) Applicant: WUHAN CHINA STAR OPTOELECTRONICS TECHNOLOGY CO., LTD., Hubei (CN)

(72) Inventor: Jiedong Han, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/043,443

(22) PCT Filed: Feb. 9, 2023

(86) PCT No.: PCT/CN2023/075195
§ 371 (c)(1),
(2) Date: Feb. 28, 2023

(87) PCT Pub. No.: WO2024/098563
PCT Pub. Date: May 16, 2024

(65) Prior Publication Data
US 2025/0147355 A1 May 8, 2025

(30) Foreign Application Priority Data
Nov. 7, 2022 (CN) .......................... 202211386744.2

(51) Int. Cl.
G02F 1/1335 (2006.01)
G02F 1/13357 (2006.01)
G02F 1/1368 (2006.01)

(52) U.S. Cl.
CPC .. *G02F 1/133512* (2013.01); *G02F 1/133602* (2013.01); *G02F 1/133605* (2013.01);
(Continued)

(58) Field of Classification Search
CPC ......... G02F 1/133512; G02F 1/133602; G02F 1/133605; G02F 1/133606; G02F 1/133611; G02F 1/1368
See application file for complete search history.

(56) References Cited

U.S. PATENT DOCUMENTS

2019/0228721 A1* 7/2019 Wang ................... G09G 3/3413
2021/0405407 A1* 12/2021 Sun ........................ G02F 1/1339

FOREIGN PATENT DOCUMENTS

| CN | 108594524 A | 9/2018 |
|---|---|---|
| CN | 111176018 A | 5/2020 |

(Continued)

OTHER PUBLICATIONS

Chen et al., CN_113467123, machine translation, Oct. 2021 (Year: 2021).*

(Continued)

*Primary Examiner* — Tracie Y Green
(74) *Attorney, Agent, or Firm* — PV IP PC; Wei Te Chung

(57) ABSTRACT

A display device is disposed. The display device includes a first backlight module and a display panel, and the display panel is disposed on the backlight module. The first backlight module has an opening, and the opening passes through the first backlight module. The first backlight module includes a substrate, a plurality of light emitting units, and at least one light blocking structure. The light blocking structure is disposed on the substrate and surrounds the opening. The light emitting units are disposed on the substrate, and the light emitting units are disposed on a side of the light blocking structure away from the opening.

19 Claims, 2 Drawing Sheets

(52) U.S. Cl.
CPC .. *G02F 1/133606* (2013.01); *G02F 1/133611* (2013.01); *G02F 1/1368* (2013.01)

(56) References Cited

FOREIGN PATENT DOCUMENTS

| | | |
|---|---|---|
| CN | 111198458 A | 5/2020 |
| CN | 111679482 A | 9/2020 |
| CN | 112987398 A | 6/2021 |
| CN | 113176682 A | 7/2021 |
| CN | 113467123 A | 10/2021 |
| CN | 115685617 A | 2/2023 |
| KR | 20070072188 A | 7/2007 |

OTHER PUBLICATIONS

He et al., CN_112987398 machine translation, Jun. 2021 (Year: 2021).*
Zhou et al., CN_113176682_machine translation Jul. 2021 (Year: 2021).*
Chinese Office Action issued in corresponding Chinese Patent Application No. 202211386744.2 dated Jul. 25, 2023, pp. 1-9.
International Search Report in International application No. PCT/CN2023/075195,mailed on Jun. 26, 2023.
Written Opinion of the International Search Authority in International application No. PCT/CN2023/075195,mailed on Jun. 26, 2023.

* cited by examiner

DISPLAY DEVICE INCLUDING LIGHT BLOCKING STRUCTURE

FIELD OF THE DISCLOSURE

The present application relates to the technical field of display technologies, and more particularly, to a display device.

BACKGROUND

With the development of display technologies, display screens with high screen ratio for terminal devices have become a mainstream trend. Because terminal devices are equipped with functional devices that require lighting, such as cameras and light sensors, it is difficult to maximize the screen ratio of the display screen.

In the display device of the prior art, in order to maximize the screen ratio of the display screen, the camera is disposed below the display screen. As shown in FIG. 1, the display device includes a display panel Pa, a backlight module BLU, a camera component Ca, a light shielding adhesive 3, a metal frame 1, and a sealant 2. The backlight module BLU has an opening, and the camera component Ca is disposed in the opening. In the display device, the display panel Pa corresponding to the opening is only used as a lighting window of the camera component Ca without display function. In addition, in order to prevent light leakage of the backlight module BLU from affecting shooting of the camera component Ca, the light shielding adhesive 3, the metal frame 1, and the sealant 2 must be disposed to shield the light diffused laterally from the backlight module BLU to the opening. Due to the use of the light shielding adhesive 3, the metal frame 1, and the sealant 2, the display panel Pa corresponding to the light shielding adhesive 3 presents black borders, so that full-screen display cannot be realized. If the light shielding adhesive 3, the metal frame 1, and the sealant 2 are not provided, it may cause light leakage of the backlight module BLU.

SUMMARY

Technical Problem

An embodiment of the present application provides a display device for improving light leakage of a backlight module.

Technical Solution

An embodiment of the present application provides a display device, including:
a first backlight module, wherein the first backlight module has an opening, the opening passes through the first backlight module, the first backlight module comprises a substrate, a plurality of light emitting units, and at least one light blocking structure, the at least one light blocking structure is disposed on the substrate and is disposed around the opening, the plurality of light emitting units are disposed on the substrate, and the plurality of light emitting units are disposed on a side of the at least one light blocking structure away from the opening; and a display panel disposed on the first backlight module.

Optionally, in some embodiments provided in the present application, the plurality of light emitting units comprise at least one first light emitting unit disposed on a peripheral side of the opening and at least one second light emitting unit located on a side of the at least one first light emitting unit away from the opening; and
wherein the at least one first light emitting unit and the at least one second light emitting unit are configured to emit light at different times.

Optionally, in some embodiments provided in the present application, the plurality of light emitting units comprise a plurality of first light emitting units, and the plurality of first light emitting units are disposed around the at least one light blocking structure.

Optionally, in some embodiments provided in the present application, the display device further comprises a photosensitive component disposed on a side of the first backlight module away from the display panel, and the photosensitive component is disposed corresponding to the opening.

Optionally, in some embodiments provided in the present application, the display device further comprises a second backlight module, a light output surface of the second backlight module is disposed corresponding to the opening, and the second backlight module is located on a side of the photosensitive component close to the opening.

Optionally, in some embodiments provided in the present application, a width of the second backlight module is greater than a width of the opening, the side of the first backlight module away from the display panel is provided with an adhesive, and the second backlight module is attached to the adhesive.

Optionally, in some embodiments provided in the present application, a side of the at least one light blocking structure close to the plurality of light emitting units is an arc surface, and a curvature center of the arc surface is located on a side of the arc surface facing the opening.

Optionally, in some embodiments provided in the present application, a cross-sectional shape of the at least one light blocking structure in a thickness direction of the display panel is circular or elliptical.

Optionally, in some embodiments provided in the present application, the first backlight module further comprises a reflecting layer, a light conducting layer, a diffusion layer, a brightness enhancing layer, and a light shielding structure on a side of the plurality of light emitting units away from the substrate, the reflecting layer, the light conducting layer, the diffusing layer, and the brightness enhancing layer are stacked on the side of the plurality of light emitting units away from the substrate, and the light shielding structure is disposed on sides of the light conducting layer, the diffusion layer, and the brightness enhancing layer close to the opening.

Optionally, in some embodiments provided in the present application, a height of the at least one light blocking structure is greater than a height of the plurality of light emitting units.

Optionally, in some embodiments provided in the present application, the first backlight module further comprises an encapsulation adhesive layer, the encapsulation adhesive layer is disposed on the substrate and covers the plurality of the light emitting units and the light blocking structure, and a thickness of the encapsulation adhesive layer is greater than or equal to the height of the at least one light blocking structure.

Optionally, in some embodiments provided in the present application, a material of the at least one light blocking structure comprises white ink.

Optionally, in some embodiments provided in the present application, the display panel comprises a first substrate, a liquid crystal layer, and a second substrate sequentially stacked on the backlight module, the first substrate comprises a base substrate and a thin film transistor layer disposed on the base substrate, the base substrate has a groove, and the groove communicates with the opening.

Correspondingly, the embodiment of the present application also provides a display device, which includes:

a first backlight module, wherein the first backlight module has an opening, the opening passes through the first backlight module, the first backlight module comprises a substrate, a plurality of light emitting units, and at least one light blocking structure, the at least one light blocking structure is disposed on the substrate and is disposed around the opening, the plurality of light emitting units are disposed on the substrate, and the plurality of light emitting units are disposed on a side of the at least one light blocking structure away from the opening;

a second backlight module, wherein a light output surface of the second backlight module is disposed corresponding to the opening; and a display panel disposed on the first backlight module.

Optionally, in some embodiments provided in the present application, the plurality of light emitting units comprise at least one first light emitting unit disposed on a peripheral side of the opening and at least one second light emitting unit located on a side of the at least one first light emitting unit away from the opening; and wherein the at least one first light emitting unit and the at least one second light emitting unit are configured to emit light at different times.

Optionally, in some embodiments provided in the present application, the plurality of light emitting units comprise a plurality of first light emitting units, and the plurality of first light emitting units are disposed around the at least one light blocking structure.

Optionally, in some embodiments provided in the present application, the display device further comprises a photosensitive component disposed on a side of the first backlight module away from the display panel, wherein the photosensitive component is disposed corresponding to the opening.

Optionally, in some embodiments provided in the present application, a width of the second backlight module is greater than a width of the opening, the side of the first backlight module away from the display panel is provided with an adhesive, and the second backlight module is attached to the adhesive.

Optionally, in some embodiments provided in the present application, a side of the at least one light blocking structure close to the plurality of light emitting units is an arc surface, and a curvature center of the arc surface is located on a side of the arc surface facing the opening.

Optionally, in some embodiments provided in the present application, the display panel comprises a first substrate, a liquid crystal layer, and a second substrate sequentially stacked on the backlight module, the first substrate comprises a base substrate and a thin film transistor layer disposed on the base substrate, the base substrate has a groove, and the groove communicates with the opening.

Beneficial Effect

An embodiment of the present application provides a display device. The display device includes a first backlight module and a display panel, and the display panel is disposed on the first backlight module. The first backlight module has an opening, and the opening passes through the first backlight module. The first backlight module includes a substrate, a plurality of light emitting units, and at least one light blocking structure. The light blocking structure is disposed on the substrate and surrounds the opening. The light emitting units are disposed on the substrate, and the light emitting units are disposed on a side of the light blocking structure away from the opening. In the embodiment of the present application, the light blocking structure is provided on a side of the light emitting units close to the opening, so as to shield light leaking laterally from the first backlight module. Therefore, the display device provided by the embodiment of the present application can be used to improve light leakage of the backlight module.

BRIEF DESCRIPTION OF THE DRAWINGS

In order to more clearly illustrate the technical solutions in the embodiments of the present application, the following briefly introduces the drawings that need to be used in the description of the embodiments. Apparently, the drawings in the following description are only some embodiments of the present application. For those skilled in the art, other drawings can also be obtained based on these drawings without any creative effort.

DETAILED DESCRIPTION

Figure 1:
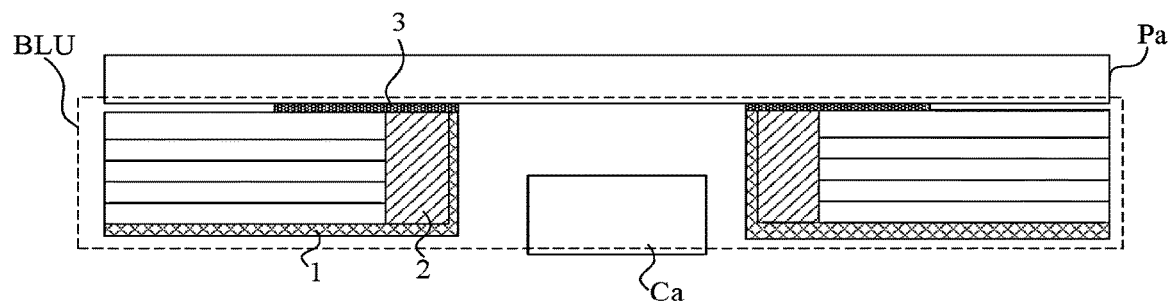
FIG. 1 is a schematic structural diagram of a display device provided in a comparative embodiment of the present application.

In order to make the purpose, technical solution, and advantages of the present application clearer, the present application will be further described in detail below in conjunction with the accompanying drawings. Please refer to the drawings in the accompanying drawings, wherein same reference numerals refer to same components. The following description is based on the illustrated embodiments of the present application and should not be construed as limiting the present application to other embodiments not described in detail herein. The word "embodiment" as used in this specification means an example, instance, or illustration.

In the description of the present application, it should be understood that the orientation or positional relationship indicated by the terms such as "center", "longitudinal", "transverse", "length", "width", "thickness", "upper", "lower", "front", "back", "left", "right", "vertical", "horizontal", "top", "bottom", "inner", "outer", "clockwise", "counterclockwise", etc. is based on the orientation or positional relationship shown in the drawings. This is only for the convenience of describing the present application and simplifying the description, rather than indicating or implying that the device or element referred to must have a specific orientation, be constructed and operated in a specific orientation, and thus should not be construed as limiting the present application. In addition, the terms "first" and "second" are used for descriptive purposes only, and cannot be interpreted as indicating or implying relative importance or implicitly specifying the quantity of indicated technical features. Thus, a feature defined as "first" or "second" may explicitly or implicitly include one or more of said features. In the description of the present application, "plurality" means two or more, unless otherwise specifically defined.

The display device provided by the present application will be described in detail below through specific embodiments.

Figure 2:
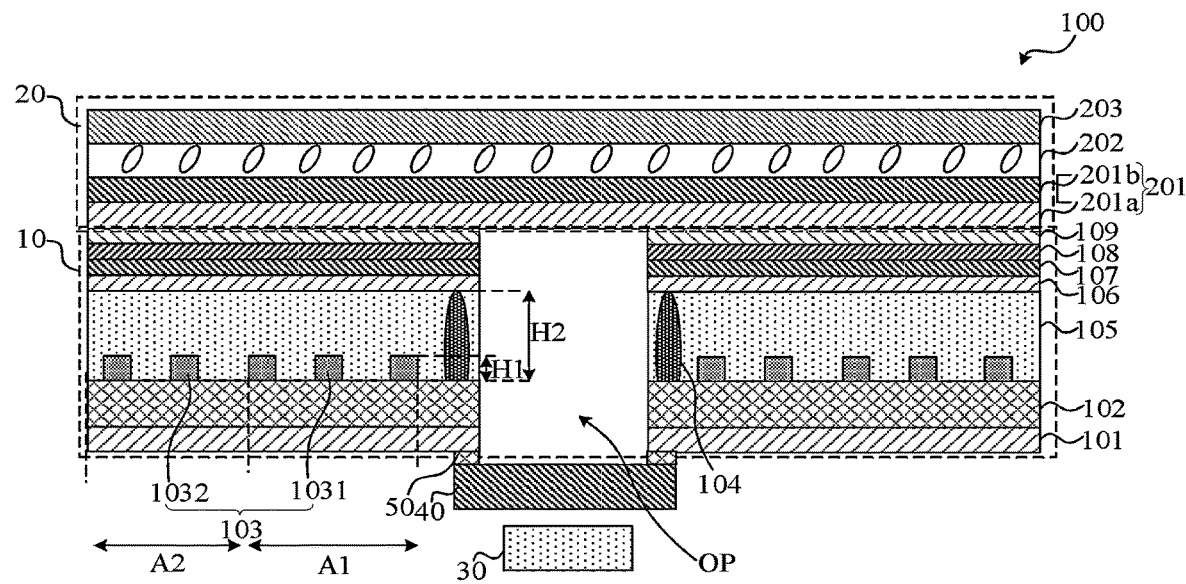
FIG. 2 is a schematic diagram of a first structure of a display device provided by an embodiment of the present application.

Referring to FIG. 2, FIG. 2 is a schematic diagram of a first structure of a display device provided by an embodiment of the present application. An embodiment of the present application provides a display device. The display device 100 includes a first backlight module 10, a display panel 20, and a photosensitive component 30. The display panel 20 is disposed on the first backlight module 10. The first backlight module 10 has an opening Op, and the opening Op passes through the first backlight module 10. The first backlight module 10 includes a substrate 101, a plurality of light emitting units 103, and at least one light blocking structure 104. A plurality of light blocking structures 104 are disposed on the substrate 101 and surround the opening Op. The light emitting units 103 are disposed on the substrate 101, and the light emitting units 103 are disposed on a side of the light blocking structure 104 away from the opening Op. The photosensitive component 30 is disposed on a side of the first backlight module 10 away from the display panel 20, and the photosensitive component 30 is disposed corresponding to the opening Op. In the embodiment of the present application, the light blocking structure 104 is provided on the side of the light emitting unit 103s close to the opening Op, so as to shield light leaking laterally from the first backlight module 10 and improve light leakage of the backlight module. Moreover, the display device 100 provided by the embodiment of the present application can be used to avoid light leakage from the first backlight module 10 affecting the photographing performance of the photosensitive component 30.

It should be noted that the photosensitive component 30 in the embodiment of the present application may be a camera component.

It should be understood that, in the embodiment of the present application, the display panel 20 includes a first area and a second area. The first area surrounds at least a portion of the second area. The opening Op is disposed corresponding to the second area, and the photosensitive component 30 is disposed corresponding to the opening Op.

In the embodiment of the present application, the first backlight module 10 further includes a substrate 101, a driving circuit layer 102, an encapsulation layer 105, a reflecting layer 106, a light conducting layer 107, a diffusion layer 108, and a brightness enhancing layer 109.

The substrate 101 may be a metal plate, and the substrate 101 is used to support film layers above it.

The driving circuit layer 102 is disposed on a side of the substrate 101 away from the substrate 101, and a plurality of light emitting units 103 are disposed on the driving circuit layer 102. The driving circuit layer 102 includes a driving circuit for driving a plurality of light emitting units 103 to emit light.

In some embodiments, the light emitting units 103 adopt a single-color blue LED chip or a red-green-blue color LED chip. When the light emitting units 103 adopts the blue LED chip, the light conducting layer 107 contains red and green quantum dot materials.

In some embodiments, the light emitting units 103 include at least one first light emitting unit 1031 and at least one second light emitting unit 1032. The at least one first light emitting unit 1031 is disposed on a peripheral side of the opening Op, and the at least one second light emitting unit 1032 is disposed on a side of the first light emitting unit 1031 away from the opening Op. The first light emitting unit 1031 and the second light emitting unit 1032 may emit light at different times.

Specifically, when the photosensitive component 30 is turned on, the first light emitting unit 1031 does not emit light. That is to say, the embodiment of the present application utilizes a direct type backlight module, which can realize the function of local dimming (local backlight adjustment). The so-called local dimming is to divide the lights behind the screen into several groups, such as 32 groups, 64 groups, and 128 groups. Each group consists of several lamp beads in series. Usually the more groups, the finer the division, the better the dimming performance. The brightness of each group of lights is determined by the brightness of the screen, which makes the display performance better and saves energy. The local dimming system is divided into a driving device and a light bar. The driving device uses a dedicated drive IC to receive a local dimming signal provided by a T-CON board or a main board, demodulates the local dimming signal, and sends it to several 16-channel drivers. In the embodiment of the present application, local backlight dimming is used. When the photosensitive component 30 is turned on, the first light emitting units 1031 do not emit light, thereby further improving the photographing performance of the photosensitive component 30.

In the embodiment of the present application, the plurality of light emitting units 103 may include a plurality of first light emitting units 1031, and the plurality of first light emitting units 1031 are disposed around the light blocking structure 104.

It should be understood that, in the embodiment of the present application, the first light emitting unit 1031 and the second light emitting unit 1032 have the same structure. In this application, the light emitting unit 103 is named as the first light emitting unit 1031 and the second light emitting unit 1032 for convenience of description.

It can be understood that the first backlight module 10 has a first sub-area A1 and a second sub-area A2, the first light emitting unit 1031 is located in the first sub-area A1, and the second light emitting unit 1032 is located in the second sub-area A2.

Specifically, the driving circuit includes a local dimming backlight driving circuit. The local dimming backlight driving circuit includes L LED drivers, L*N row driving switches, and L*(16-N) column driving switches. The light emitting units 103 include L*(16-N) groups, and the number of light emitting units 103 in each group is N. Multiple control terminals of each LED driver are connected to the controlled terminals of N row driving switches and (16-N) column driving switches in a one-to-one correspondence. The input terminals of each of the N row driving switches are used to connect to a DC power supply. An output terminal of each row driving switch is correspondingly connected to a light emitting unit 103 in the (16-N) group. Cathodes of the (16-N) groups of light emitting unit 103 are connected to input terminals of the (16-N) column driving switches in one-to-one correspondence, and the output terminals of the (16-N) column driving switches are grounded. L LED drivers are used to output timing control signals to control L*N row drive switches 20 to be turned on row by row, and are used to output column drive control signals to control L*(16-N) column drive switches to be turned on/off. L is greater than or equal to 1, and N is greater than or equal to 2.

In some embodiments, a height H2 of the light blocking structure 104 is greater than a height H1 of the light emitting unit 103. This method can block the light emitted by the light emitting unit 103 and prevent the light emitted by the light emitting unit 103 from diffusing into the opening Op, thereby affecting the photographing performance of the photosensitive component 30.

In some embodiments, a ratio of the height H1 to a width of the light blocking structure 104 ranges from 1:2 to 1:2.5. The light blocking structure 104 can be formed on the substrate 101 by a spraying process.

In some embodiments, a side of the light blocking structure 104 close to the light emitting unit 103 is an arc surface, and a curvature center of the arc surface is located on a side of the arc surface facing the opening Op. Because the side of the light blocking structure 104 close to the light emitting unit 103 is an arc surface, and a center of curvature of the arc surface is located on the side of the arc surface facing the opening Op, when the light emitted by the light emitting unit 103 is reflected to the arc surface, the light is reflected to the display panel 20 through the arc surface to compensate for black borders, thereby increasing the screen ratio.

In some embodiments, a cross-sectional shape of the light blocking structure 104 in a thickness direction of the display panel 20 may be circular or elliptical.

In some embodiments, a material of the light blocking structure 104 includes white ink. The white ink has a high reflectivity, so that it can effectively reflect light to the display panel 20, compensate for the black borders, and thus increase the screen ratio.

The reflectance of the light blocking structure 104 is greater than or equal to 85%.

It should be understood that, in the embodiment of the present application, the light blocking structure 104 is arranged in one or more circles around the opening Op. A plurality of light blocking structures 104 disposed around the opening Op form a circle or a square.

An encapsulation adhesive layer 105 is disposed on the driving circuit layer 102 and covers the plurality of light emitting units 103 and the light blocking structure 104.

In some embodiments, a thickness of the encapsulant adhesive layer 105 is greater than or equal to a height of the light blocking structure 104. This method can further block the light emitted by the light emitting unit 103 and prevent the light emitted by the light emitting unit 103 from diffusing into the opening Op, thereby affecting the photographing performance of the photosensitive component 30.

The reflecting layer 106, the light conducting layer 107, the diffusion layer 108, and the brightness enhancing layer 109 are sequentially stacked on the encapsulation adhesive layer 105. The reflecting layer 106 is used to emit the light emitted by the light emitting unit 103. The light conducting layer 107 is made of organic plastic film, usually acrylic (PMMA), polyethylene terephthalate (PET), or polycarbonate (PC). The light conducting layer 107 has a transmittance of at least 85%. The brightness enhancing layer 109 is used to increase the brightness of the backlight. The diffusion layer 108 is generally made of PET (polyethylene terephthalate) or PC (polycarbonate) substrate, with a smooth front and a rough back. Because there are diffusion particles in the diffusion layer 108, the diffusion particles can make the light uniformly transmitted in the diaphragm, so as to achieve uniform light mixing. The light emitted by the light emitting unit 103 enters the diffusion layer 108 and undergoes multiple refraction, reflection, and scattering. The light is transmitted laterally in the diffusion layer 108 to make the backlight more uniform.

The display device 100 further includes a second backlight module 40 and adhesive 50. The light emitting surface of the second backlight module 40 is disposed corresponding to the opening Op, and the second backlight module 40 is disposed on a side of the photosensitive component 30 close to the opening Op.

In some embodiments, the width of the second backlight module 40 is greater than or equal to the width of the opening Op. The adhesive 50 is disposed on the side of the first backlight module 10 away from the display panel 20, and the second backlight module 40 is attached on the adhesive 50.

In this application, when the display device 100 displays images and the photosensitive component 30 is not activated, the first light emitting unit 1031 and the second light emitting unit of the first backlight module 10 and the light emitting unit of the second backlight module 40 are activated. At this time, the display panel 20 receives light from the corresponding backlight module, such that the display panel 20 realizes a full-screen display.

When the display device 100 displays an image and the photosensitive component 30 is activated, the second light emitting unit 1032 located in the second sub-area A2 emits light, the first light emitting unit 1031 located in the first sub-area A1 does not emit light, and the light emitting unit of the second backlight module 40 is turned off. The external light is transmitted to the photosensitive component 30, so that the photosensitive component 30 acquires the external light to capture an image. When the photosensitive component 30 is activated, the light blocking structure 104 can block the light leaking from the first backlight module 10 laterally. Moreover, a light source of the second backlight module 40 is turned off, which ensures that no light from the second backlight module 40 enters a lighting path of the photosensitive component 30. Moreover, because the first light emitting unit 1031 of the first sub-area A1 does not emit light, a lateral distance from the light leakage of the first backlight module 10 to a light emitting channel of the photosensitive component 30 is increased. Furthermore, the arrangement of the light blocking structure 104 can greatly reduce the risk of lowering the shooting quality due to light leakage.

The display panel 20 includes a first substrate 201, a liquid crystal layer 202, and a second substrate 203 which are sequentially stacked on the first backlight module 10. In some embodiments, the first substrate 201 may be an array substrate, and the second substrate 203 may be a color filter substrate.

Figure 3:
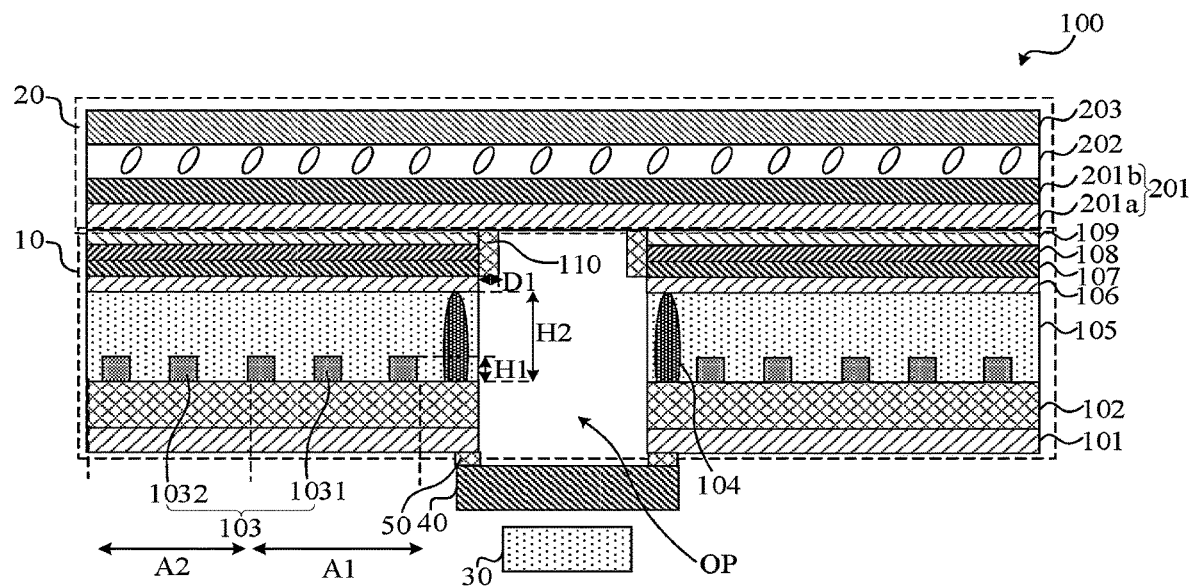
FIG. 3 is a schematic diagram of a second structure of a display device provided by an embodiment of the present application.

Referring to FIG. 3, FIG. 3 is a schematic diagram of a second structure of a display device 100 provided by an embodiment of the present application. The difference between the display device 100 provided in the embodiment of the present application and the display device 100 provided in FIG. 2 is that, the display device 100 further includes a light shielding structure 110. The light shielding structure 110 is disposed on sides of the light conducting layer 107, the diffusion layer 108, and the brightness enhancing layer 109 close to the opening Op.

In the embodiment of the present application, the light shielding structure 110 is disposed on the sides of the light conducting layer 107, the diffusion layer 108, and the brightness enhancing layer 109 close to the opening Op, so as to shield light leaking laterally from the first backlight module 10 and further reduce the risk of reducing the shotting quality due to light leakage.

In addition, because the light shielding structure 110 in the embodiment of the present application is disposed on the sides of the light conducting layer 107, the diffusion layer 108, and the brightness enhancing layer 109 close to the opening Op, there is no need to arrange a light shielding adhesive and an encapsulation adhesive on the first backlight module 10, so as to reduce the black borders of the display device 100.

In some embodiments, a width D1 of the light shielding structure 110 is less than or equal to 300 microns. For example, the width of the light shielding structure 110 may be any one of 300 microns, 250 microns, 200 microns, 180 microns, 150 microns, 100 microns, or 50 microns. In the embodiment of the present application, the width of the light shielding structure 110 is set to be less than or equal to 300 microns. On the one hand, the reflective performance of the light shielding structure 110 is ensured, and on the other hand, compared with the prior art solution of using the light shielding adhesive for light shielding, the black borders of the display device 100 are greatly reduced.

In some embodiments, the material of the light shielding structure 110 includes white ink. The white ink has a high reflectivity, so that it can effectively reflect light to the display panel 20, compensate for the black borders, and thus increase the screen ratio.

The reflectance of the light shielding structure 110 is greater than or equal to 85%.

In some embodiments, white ink can be printed on the sides of the light conducting layer 107, the diffusion layer 108, and the brightness enhancing layer 109 close to the opening Op by a screen-printing process.

Figure 4:
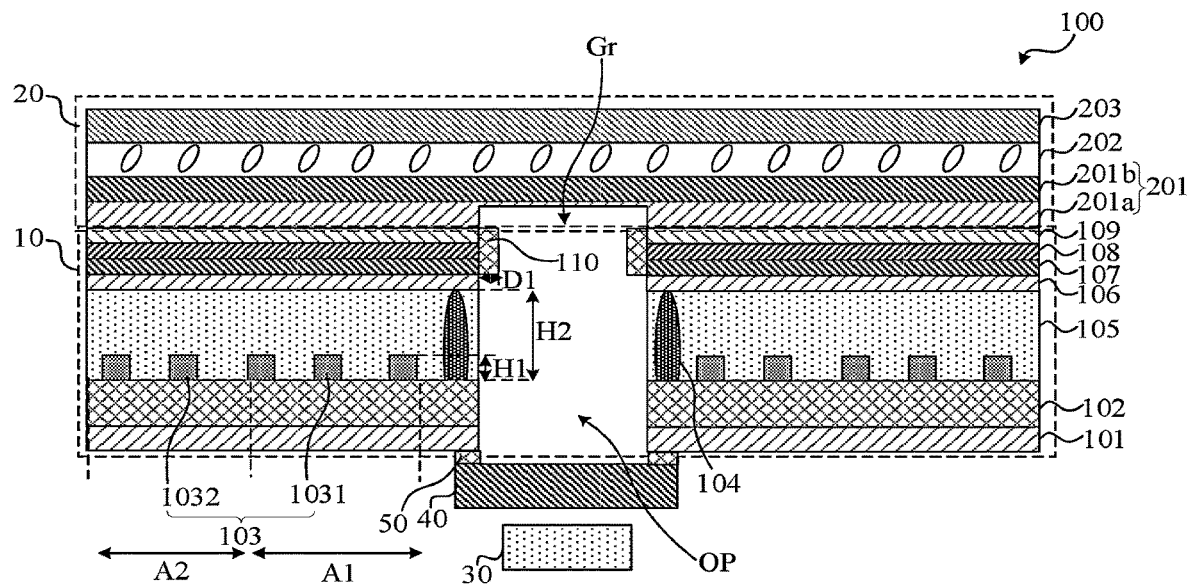
FIG. 4 is a schematic diagram of a third structure of a display device provided by an embodiment of the present application.

Referring to FIG. 4, FIG. 4 is a schematic diagram of a third structure of a display device provided by an embodiment of the present application. The difference between the display device 100 provided in the embodiment of the present application and the display device 100 provided in FIG. 3 is that, the first substrate 201 includes a base substrate 201a and a thin film transistor layer 201b disposed on the base substrate 201a, the base substrate 201a has a groove Gr, and the groove Gr communicates with the opening Op. In the embodiment of the present application, the groove Gr communicating with the opening Op is provided on the base substrate 201a, so as to increase the light transmittance of the display panel 20 corresponding to the opening Op.

It should be noted that, in the embodiment of the present application, the display device 100 may be a mobile phone, or any electronic product with a display function, including but not limited to the following categories: TVs, notebook computers, desktop monitors, tablet computers, digital cameras, smart bracelets, smart glasses, vehicle displays, medical equipment, industrial control equipment, touch interactive terminals, etc., which are not specifically limited in this embodiment of the application.

In summary, although the present application has disclosed the above with preferred embodiments, the above preferred embodiments are not intended to limit the present application. Those skilled in the art can make various changes and modifications without departing from the spirit and scope of the present application. Therefore, the protection scope of the present application is subject to the scope defined by the claims.

What is claimed is:

1. A display device, comprising:
a first backlight module, wherein the first backlight module has an opening, the opening passes through the first backlight module, the first backlight module comprises a substrate, a plurality of light emitting units, and at least one light blocking structure, the at least one light blocking structure is disposed on the substrate and is disposed around the opening, the plurality of light emitting units are disposed on the substrate, and the plurality of light emitting units are disposed on a side of the at least one light blocking structure away from the opening, and none of the plurality of light emitting units are provided on a side of the at least one light blocking structure closer to the opening; and
a display panel disposed on the first backlight module;
wherein the plurality of light emitting units comprise at least one first light emitting unit disposed on a peripheral side of the opening and at least one second light emitting unit located on a side of the at least one first light emitting unit away from the opening; and
wherein the at least one first light emitting unit and the at least one second light emitting unit are configurable to emit light at different times.

2. The display device of claim 1, wherein the plurality of light emitting units comprise a plurality of first light emitting units, and the plurality of first light emitting units are disposed around the at least one light blocking structure.

3. The display device of claim 1, further comprising a photosensitive component disposed on a side of the first backlight module away from the display panel, wherein the photosensitive component is disposed corresponding to the opening.

4. The display device of claim 3, further comprising a second backlight module, wherein a light output surface of the second backlight module is disposed corresponding to the opening, and the second backlight module is located on a side of the photosensitive component close to the opening.

5. The display device of claim 4, wherein a width of the second backlight module is greater than a width of the opening, the side of the first backlight module away from the display panel is provided with an adhesive, and the second backlight module is attached to the adhesive.

6. The display device of claim 1, wherein a side of the at least one light blocking structure close to the plurality of light emitting units is an arc surface, and a curvature center of the arc surface is located on a side of the arc surface facing the opening.

7. The display device of claim 6, wherein a cross-sectional shape of the at least one light blocking structure in a thickness direction of the display panel is circular or elliptical.

8. The display device of claim 1, wherein the first backlight module further comprises a reflecting layer, a light conducting layer, a diffusion layer, a brightness enhancing layer, and a light shielding structure on a side of the plurality of light emitting units away from the substrate, the reflecting layer, the light conducting layer, the diffusing layer, and the brightness enhancing layer are stacked on the side of the plurality of light emitting units away from the substrate, and the light shielding structure is disposed on sides of the light conducting layer, the diffusion layer, and the brightness enhancing layer close to the opening.

9. The display device of claim 1, wherein a height of the at least one light blocking structure is greater than a height of the plurality of light emitting units.

10. The display device of claim 9, wherein the first backlight module further comprises an encapsulation adhesive layer, the encapsulation adhesive layer is disposed on the substrate and covers the plurality of the light emitting units and the light blocking structure, and a thickness of the encapsulation adhesive layer is greater than or equal to the height of the at least one light blocking structure.

11. The display device of claim 1, wherein a material of the at least one light blocking structure comprises white ink.

12. The display device of claim 1, wherein the display panel comprises a first substrate, a liquid crystal layer, and a second substrate sequentially stacked on the backlight module, the first substrate comprises a base substrate and a thin film transistor layer disposed on the base substrate, the base substrate has a groove, and the groove communicates with the opening.

13. A display device, comprising:
a first backlight module, wherein the first backlight module has an opening, the opening passes through the first backlight module, the first backlight module comprises a substrate, a plurality of light emitting units, and at least one light blocking structure, the at least one light blocking structure is disposed on the substrate and is disposed around the opening, the plurality of light emitting units are disposed on the substrate, and the plurality of light emitting units are disposed on a side of the at least one light blocking structure away from the opening;
a second backlight module, wherein a light output surface of the second backlight module is disposed corresponding to the opening; and
a display panel disposed on the first backlight module;
wherein a cross-sectional shape of the at least one light blocking structure in a thickness direction of the display panel is circular or elliptical.

14. The display device of claim 13, wherein the plurality of light emitting units comprise at least one first light emitting unit disposed on a peripheral side of the opening and at least one second light emitting unit located on a side of the at least one first light emitting unit away from the opening; and
wherein the at least one first light emitting unit and the at least one second light emitting unit are configured to emit light at different times.

15. The display device of claim 14, wherein the plurality of light emitting units comprise a plurality of first light emitting units, and the plurality of first light emitting units are disposed around the at least one light blocking structure.

16. The display device of claim 13, further comprising a photosensitive component disposed on a side of the first backlight module away from the display panel, wherein the photosensitive component is disposed corresponding to the opening.

17. The display device of claim 13, wherein a width of the second backlight module is greater than a width of the opening, the side of the first backlight module away from the display panel is provided with an adhesive, and the second backlight module is attached to the adhesive.

18. The display device of claim 13, wherein a side of the at least one light blocking structure close to the plurality of light emitting units is an arc surface, and a curvature center of the arc surface is located on a side of the arc surface facing the opening.

19. The display device of claim 13, wherein the display panel comprises a first substrate, a liquid crystal layer, and a second substrate sequentially stacked on the backlight module, the first substrate comprises a base substrate and a thin film transistor layer disposed on the base substrate, the base substrate has a groove, and the groove communicates with the opening.

* * * * *